US010399290B2

(12) United States Patent
Chang et al.

(10) Patent No.: US 10,399,290 B2
(45) Date of Patent: Sep. 3, 2019

(54) COMPOSITE MATERIAL HAVING APERTURE AND METHOD OF MANUFACTURING THE SAME

(71) Applicant: Hyundai Motor Company, Seoul (KR)

(72) Inventors: Hoon Chang, Seoul (KR); Jeong Min Cho, Suwon-Gyeonggi-do (KR); Huen Sick Min, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 144 days.

(21) Appl. No.: 15/287,334

(22) Filed: Oct. 6, 2016

(65) Prior Publication Data
US 2017/0165925 A1 Jun. 15, 2017

(30) Foreign Application Priority Data
Dec. 10, 2015 (KR) ........................ 10-2015-0176392

(51) Int. Cl.
| | | |
|---|---|---|
| *B29C 70/48* | (2006.01) | |
| *B29C 33/76* | (2006.01) | |
| *B29C 33/52* | (2006.01) | |
| *B29C 70/54* | (2006.01) | |
| *B29K 63/00* | (2006.01) | |
| *B29K 307/04* | (2006.01) | |
| *B29C 33/00* | (2006.01) | |

(52) U.S. Cl.
CPC .............. *B29C 70/48* (2013.01); *B29C 33/52* (2013.01); *B29C 33/76* (2013.01); *B29C 70/545* (2013.01); *B29C 33/0033* (2013.01); *B29K 2023/06* (2013.01); *B29K 2063/00* (2013.01); *B29K 2307/04* (2013.01); *B29K 2995/0062* (2013.01)

(58) Field of Classification Search
CPC ..... B29C 33/76; B29C 70/48; B29C 33/0033; B29C 33/52; B29C 70/545; B29K 2023/06; B29K 2063/00; B29K 2307/04; B29K 2995/0062
See application file for complete search history.

(56) References Cited

U.S. PATENT DOCUMENTS

| | | | | |
|---|---|---|---|---|
| 5,562,878 A | * | 10/1996 | Matsumoto | ........... B29C 43/206 |
| | | | | 264/512 |
| 2007/0182071 A1 | * | 8/2007 | Sekido | ................ B29C 33/0066 |
| | | | | 264/511 |
| 2015/0336329 A1 | * | 11/2015 | Lehmann | ................. B29B 11/16 |
| | | | | 156/73.1 |

FOREIGN PATENT DOCUMENTS

| | | |
|---|---|---|
| JP | 62-264896 A | 11/1987 |
| JP | H09-076385 A | 3/1997 |
| JP | 2807891 | 10/1998 |
| JP | 2002-254526 A | 9/2002 |
| JP | 2011-110796 A | 6/2011 |

(Continued)

*Primary Examiner* — Vishal I Patel
(74) *Attorney, Agent, or Firm* — Mintz Levin Cohn Ferris Glovesky and Popeo, P.C.; Peter F. Corless

(57) ABSTRACT

A method of manufacturing a composite material that is formed to include an aperture is provided. The method includes disposing a plurality of woven substances including reinforcement fibers on a jig having a protrusion to fit the woven substances on the protrusion and thus provide the aperture. Additionally, the method includes integrally mounting the jig and a plurality of the woven substances in a mold, and adding a resin to the mold to immerse the plurality of the woven substances with the resin.

9 Claims, 7 Drawing Sheets

(56) References Cited

FOREIGN PATENT DOCUMENTS

| KR | 2012-0056027 A | 6/2012 |
| KR | 10-1436454 B1 | 9/2014 |
| WO | 2013/031360 A1 | 3/2013 |

\* cited by examiner

COMPOSITE MATERIAL HAVING APERTURE AND METHOD OF MANUFACTURING THE SAME

CROSS REFERENCE TO RELATED APPLICATION

The present application claims priority to Korean Patent Application No. 10-2015-0176392 filed Dec. 10, 2015, the entire contents of which is incorporated herein for all purposes by this reference.

BACKGROUND OF THE INVENTION

1. Field of the Invention

The present invention relates to a method of manufacturing a composite material formed to include an aperture without fracturing. The composite material includes reinforcement fibers.

2. Description of the Related Art

In the related art, a composite material including carbon fibers as reinforcement fibers can be manufactured to have a layered structure. In addition, milling processing and processing using a water jet have been performed to form an aperture and other parts are mounted in or on the aperture after final molding. In that process, an additional apparatus such as a milling machine is required when the milling processing method is used. Accordingly, production costs are increased, productivity may be reduced, and processing of the aperture may be complex due to water sprayed to prevent the carbon fibers from being scattered. Further, the processing method using a water jet discharges waste water, thereby causing secondary pollution.

Moreover, the continuous fibers constituting the woven substances may be broken during the process forming the aperture, thereby reducing the strength thereof.

The above information disclosed in this Background section is merely for enhancement of understanding of the background of the invention and therefore it may contain information that does not form the related art that is already known in this country to a person of ordinary skill in the art.

SUMMARY OF THE INVENTION

The present invention provides a method of manufacturing a composite material that is formed to include an aperture using as reinforcement fibers. The composite material formed by the method of the present invention may be formed without fracturing.

In one aspect, the present invention provides a method of manufacturing a composite material that is formed to include an aperture. The method may include: disposing a plurality of woven substances including reinforcement fibers on a jig having a protrusion; aperture integrally mounting the jig and a plurality of the woven substances on the jig in a mold; and adding a resin to the mold to immerse a plurality of the woven substances with the resin. In particular, when the plurality of the woven substances are disposed on the jig having the protrusion, the woven substances may be layered on the jig, and the protrusion may penetrate each woven substance layered on the jig. Preferably, the protrusion may penetrate woven substances and an aperture may be formed in the woven substances by the protrusion.

In an exemplary embodiment, the woven substances may be woven fabrics, for example, having a sheet like shape. The method may further include: disposing a plurality of woven fabrics including reinforcement fibers on a jig having a protrusion; integrally mounting the jig and a plurality of the woven fabrics on the jig in a mold; and adding a resin to the mold to immerse a plurality of the woven fabrics with the resin. In particular, when the plurality of the woven fabrics are disposed on the jig having the protrusion, the woven fabrics may be layered on the jig, and the protrusion may penetrate each woven fabrics layered on the jig. Preferably, the protrusion may penetrate the woven fabrics to form the aperture.

The method may further comprise, after the resin is added, curing the resin added to a plurality of the woven substances that are immersed with the resin, and separating a plurality of the woven substances, that include the cured resin from the jig. The protrusion formed on the jig may have various shapes, lengths or thickness. For instance, the protrusion may have a bent shape, and the aperture may be formed in a shape corresponding to a shape of the protrusion. A protrusion and a plurality of the woven substances may be separated from the jig while a plurality of the woven substances are fitted on the protrusion during the separating step. The protrusion may be made of a water-soluble resin.

The method may further include dissolving the protrusion in water to remove the protrusion from the plurality of the woven substances after the separating of the plurality of the woven substances from the jig. The woven substances may be fitted on the protrusion using gaps in the woven substances when the plurality of the woven substances are disposed or layered on the jig. The gaps may be formed between the fibers, for example, between the reinforcement fibers.

Accordingly one aspect, the present invention provides a composite material that may include an aperture. The composite material may be manufactured using a method as described herein. The method, for example, may comprise: disposing or layering a plurality of woven substances including reinforcement fibers on a jig having a protrusion; integrally mounting the jig and a plurality of the disposed or layered woven substances in a mold; adding a resin to the mold to immerse the plurality of the woven substances with the resin; curing the resin added to the plurality of the woven substances; and separating the plurality of the woven substances including the cured resin from the jig.

The gaps in the woven substances may be widened to form the aperture. For instance, the gaps may be formed between the fibers, for example, between the reinforcement fibers. The woven substances may include carbon fibers.

Further provided is a vehicle that comprises the composite material formed to include an aperture as described herein.

Other aspects of the invention are disclosed infra.

According to various exemplary method of manufacturing the composite material formed to include an aperture of the present invention, the aperture can be formed without additional process after the composite material including reinforcement fibers is formed and cured. Further, fracture or other defects that can be formed with the reinforcement fibers in the woven substances may be prevented.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
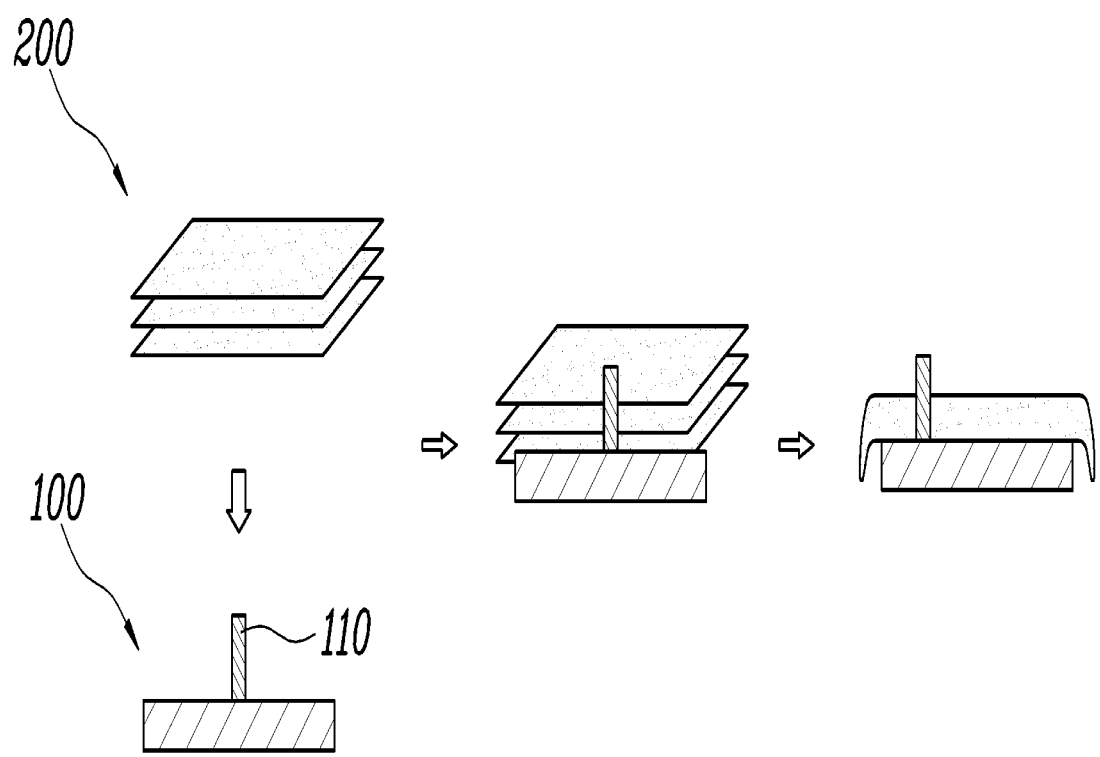
FIG. 1 shows an exemplary process of layering according to an exemplary embodiment of the present invention.
Figure 2:
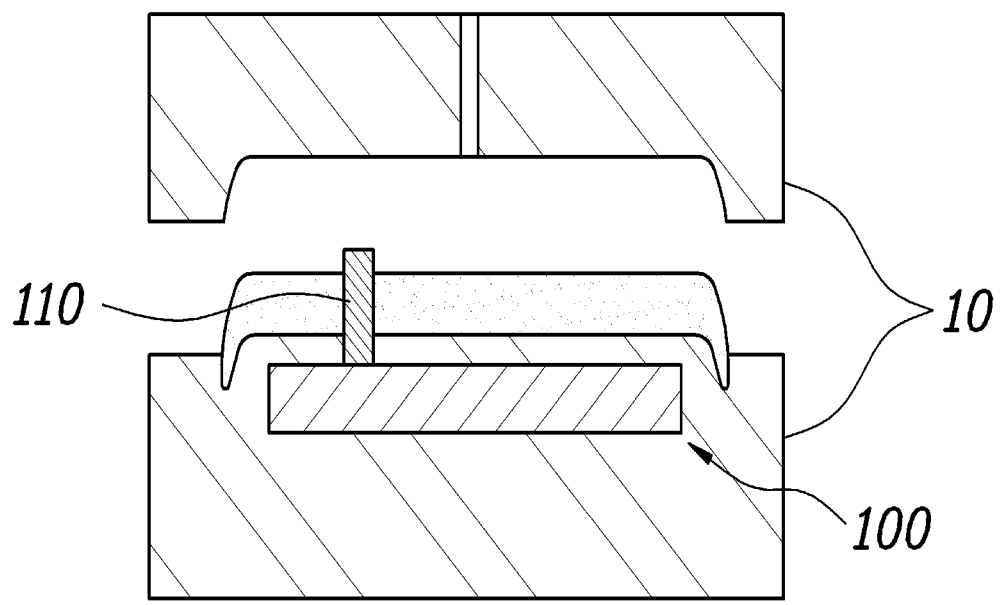
FIG. 2 shows an exemplary process of mounting according to an exemplary embodiment of the present invention.
Figure 3:
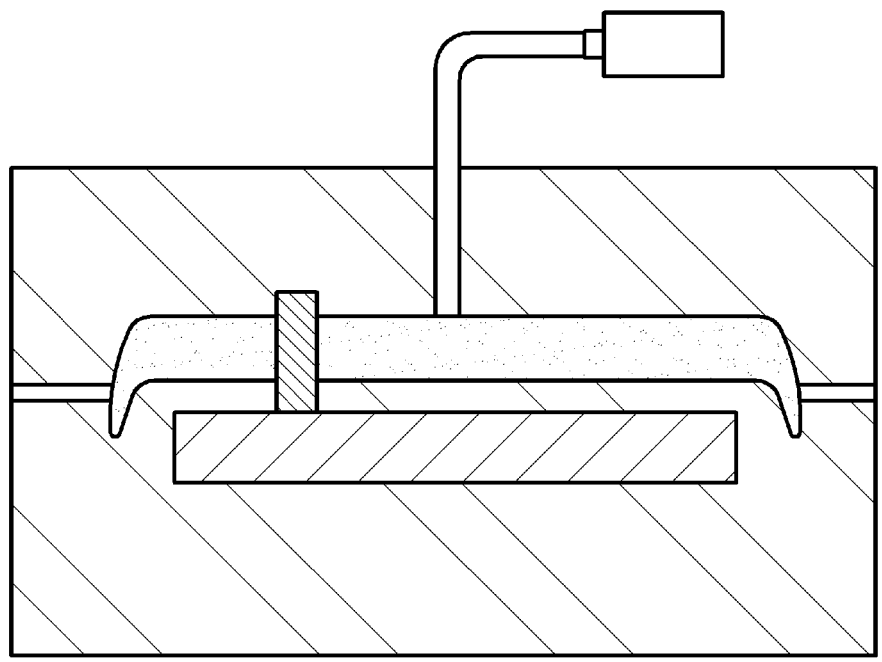
FIG. 3 shows an exemplary process of immersing according to an exemplary embodiment of the present invention.
Figure 4:
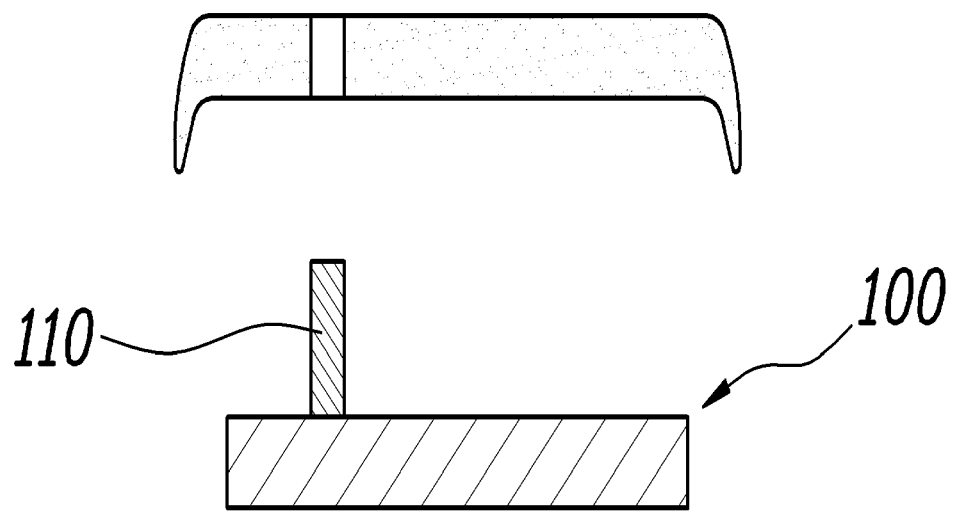
FIG. 4 shows an exemplary process of separating according to an exemplary embodiment of the present invention.
Figure 5:
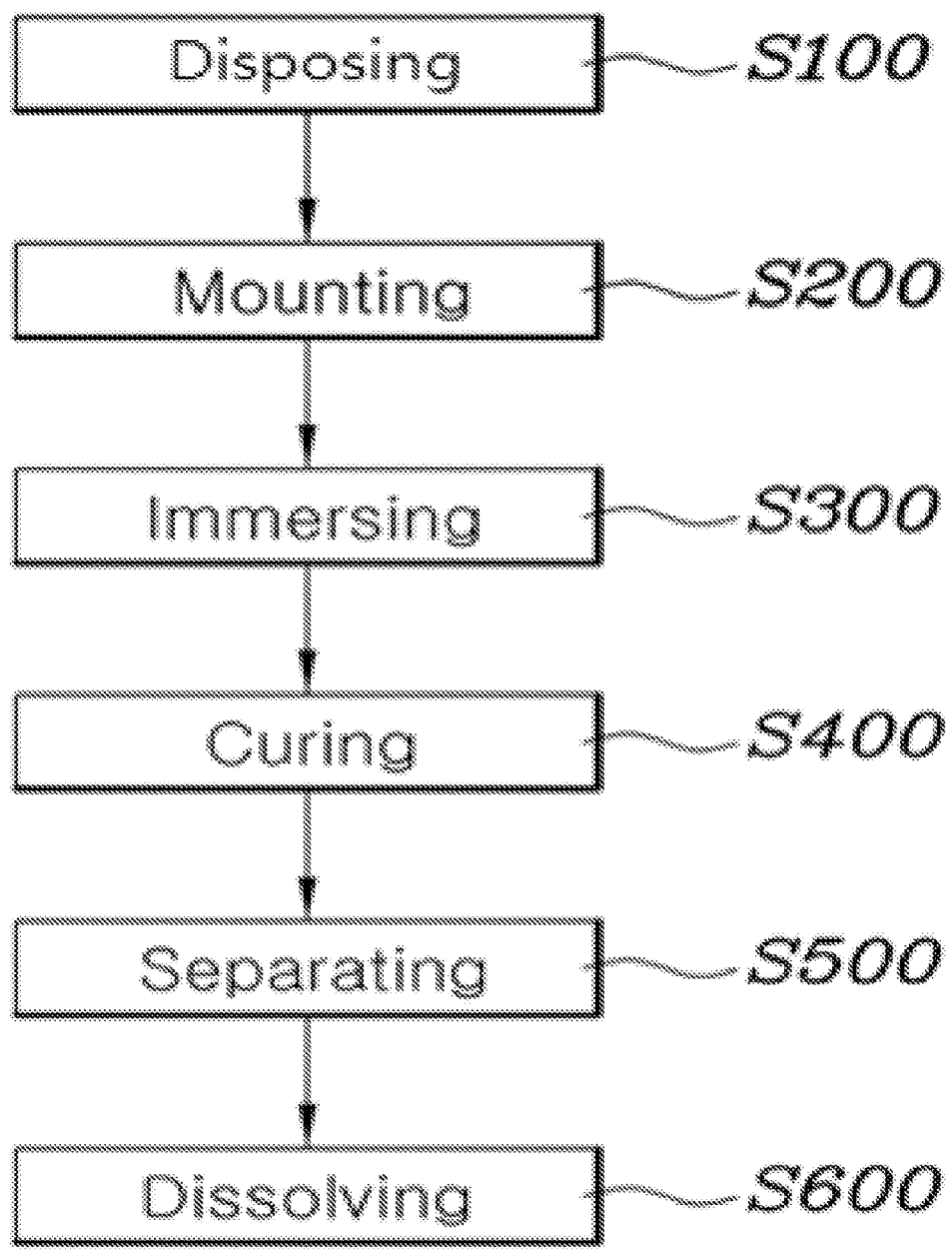
FIG. 5 shows an exemplary manufacturing process according to an exemplary embodiment of the present invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a detailed description will be given of exemplary embodiments of the present invention, with reference to the appended drawings.

A method of manufacturing a composite material that is formed to include an aperture is provided. In an exemplary embodiment, the method may include: (1) S100 disposing a plurality of woven substances 200 on a jig 100 having a protrusion 110; (2) S200 integrally mounting the jig 100 and a plurality of the woven substances 200 disposed on the jig 100 in a mold 10, and (3) S300 adding a resin to the mold 10 to immerse a plurality of the woven substances 200 with the resin.

Preferably, the woven substances, as used herein, may include reinforcement fibers.

In addition, the woven substances 200 may be fitted and penetrated by the protrusion 110 and thus the protrusion 110 may form the aperture at S100.

Further, the method may include, after adding the resin at S300, S400 curing the resin added to the mold and immersing the plurality of the woven substances 200, and S500 separating the plurality of the woven substances 200 that include the cured resin from the jig 100 at S500.

The woven substances may be disposed without limitations to orientations, numbers of the substances and the like. Preferably, the woven substances may have a planar shape, or sheet like shape. For instance, the woven substance may be a woven fabric comprising at least reinforcement fibers.

In addition, the woven substances (e.g. fabrics) may be layered until a desired thickness of the composite material is obtained. For instance, the woven substance may be a woven fabric comprising at least reinforcement fibers, and the woven fabrics may be layered in planar or be stacked, without particular limitations to the number of the woven fabrics. The layered woven fabric substances may form a thickness ranges. When the composite material having the layered structure including carbon fibers among the reinforcement fibers is manufactured, milling processing and processing using a water jet have been used to form the aperture, such that other parts may be mounted in or on the aperture after final molding in the related art.

However, an additional apparatus such as a milling machine is required when the milling processing method is used. Accordingly, production costs may be increased, productivity may be reduced, and processing of the aperture may be complex due to water sprayed to prevent the carbon fibers from being scattered. Further, the processing method using a water jet discharges waste water, thereby causing secondary pollution. Moreover, continuous fibers constituting the woven substances may be broken during aperture processing, thereby reducing the strength thereof.

Accordingly, a plurality of the woven substances 200 including the carbon fibers as reinforcement fibers may be sequentially layered on the jig 100. In particular, the jig 100 may include a flat plate and the protrusion 110 formed on the flat plate to fit the woven substances 200 on the protrusion 110. The woven substances may be layered without particular orientations thereof, and preferably, the layered woven substances may be layered to a desired shape of the final composite material.

In other words, gaps may be formed in a plurality of the woven substances 200 including the carbon fibers, for instance, between the carbon fibers. When the woven substances are layered on the flat plate of the jig 100, the protrusion 110 may penetrate or be inserted in or through the gap.

The protrusion 110 provided in the jig 100 may be tapered to have a sharp end for penetrating the gaps in the woven substances. In addition, each sectional area of the protrusion 110 may gradually increase as from an end thereof, to more easily fit the woven substances on the protrusion 110. Further, when the protrusion is inserted into or penetrates the gaps in the woven substances, the gap may be widened as the woven substances are moved or inserted to the lower side. Accordingly, the gaps at the lower side of the protrusion 110 may be wider than the gaps in the upper side, thereby preventing the woven substances from fracturing.

When the woven substances are fitted on the protrusion 110 provided in advance using the aforementioned characteristic of the woven substances, no separate process may be required to form the aperture after final molding. Accordingly, production costs may be reduced, productivity may be increased, and the aperture may be formed without a fracture caused by breaking of the continuous fibers constituting the woven substances, thereby preventing strength from being reduced. In particular, when the woven substances are fitted or positioned on the protrusion 110, the position at which the aperture is formed may be precisely specified and measured in advance so that the protrusion 110 may be inserted at a desired position.

The number of woven substances layered on the jig 100 to be fitted on the protrusion 110 may be set according to the required purpose and performance of the composite material. Simply appropriately setting the number of layered woven substance makes it possible to manufacture the composite material having the required purpose and performance.

A plurality of the woven substances 200, sequentially layered on the jig 100 to be fitted on the protrusion 110 of the jig 100, and the jig 100 may be integrally mounted in the mold 10. The resin may be subsequently added to the mold 10 through a resin inlet formed in the mold 10. A thermoplastic resin such as a polyethylene resin or a thermosetting resin such as an epoxy resin may be used as the added resin.

Simultaneously, a plurality of the layered woven substances 200 may be immersed in the resin. The immersed woven substances 200 and the resin may be further cured. Although the resin may shrink during the curing process, the curing process may be performed while the woven substances are fitted on the protrusion 110 of the jig 100, thereby avoiding conventional process of forming the aperture. After curing of the resin added to a plurality of the woven substances 200 is completed, a plurality of the woven substances 200 that are cured with the resin may be separated from the jig 100, to thereby manufacture the composite material. The aperture may be formed through the composite material after the cured woven substances are separated from the jig 100, and accordingly, no separate additional process for forming the aperture is required.

In the related art, typical protrusion 110 has been made of the same material as the mold 10 or the jig 100, but preferably may be made of steel, aluminum, high heat-resistant plastics, or high heat-resistant resins to remain in the jig and thus be reused even after the composite material is molded. The processes may be automated using a conveyor belt, and the separated jig 100 may be automatically transported back to the layering using the conveyor belt.

The curing and the separating may be performed in the reverse order.

Figure 6:
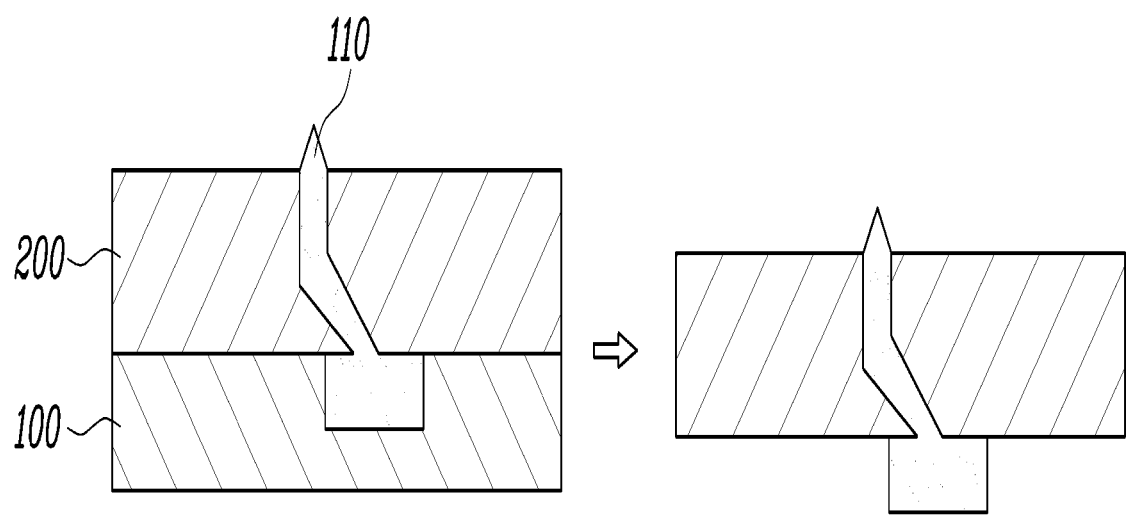
FIG. 6 shows an exemplary jig, an exemplary protrusion, and a plurality of exemplary woven substances according to an exemplary embodiment of the present invention.

The protrusion 110 may have various shape based on the desired shape of the apertures to be formed in the composite material. For example, the protrusion 110 may have a bent shape, and the aperture may correspond in shape to the protrusion 110. The protrusion 110 may have a linear shape, for example, formed perpendicularly from the flat plate of the jig. However, when the protrusion has a bent shape, as shown in FIG. 6, the aperture formed through a plurality of the woven substances 200 fitted on the protrusion 110 may have a steric shape, corresponding to the bent shape of the protrusion 110, rather than a perpendicularly open shape.

Therefore, the composite material may be manufactured such that apertures having various shapes are formed therein. In the related art, when the protrusion 110 has a bent shape, the bent protrusion 110 may not be separated from the composite material including a plurality of the woven substances 200 immersed in the resin to be cured without damaging the composite materials. To the contrary, in an exemplary embodiment of the present invention, the protrusion 110 may be separated from the jig. Particularly, the protrusion 110 may be made of a water-soluble resin that is soluble in water. For instance, a plurality of the woven substances 200 and the cured resin may be separated together from the jig 100 as the protrusion 110 having a steric shape is inserted into the aperture, and the protrusion 110 may then be dissolved in water to form the aperture having the shape of the protrusion in the composite material.

The protrusion 110 may be separated from the jig 100 during the separating process, and a plurality of the woven substances 200 and the protrusion 110 may be separated together from the jig 100 while a plurality of the woven substances 200 are fitted on the protrusion 110. Subsequently, the protrusion 110 including the water-soluble resin may be dissolved using water to remove the protrusion 110 from a plurality of the woven substances 200 at S600 after the separating.

Figure 7:
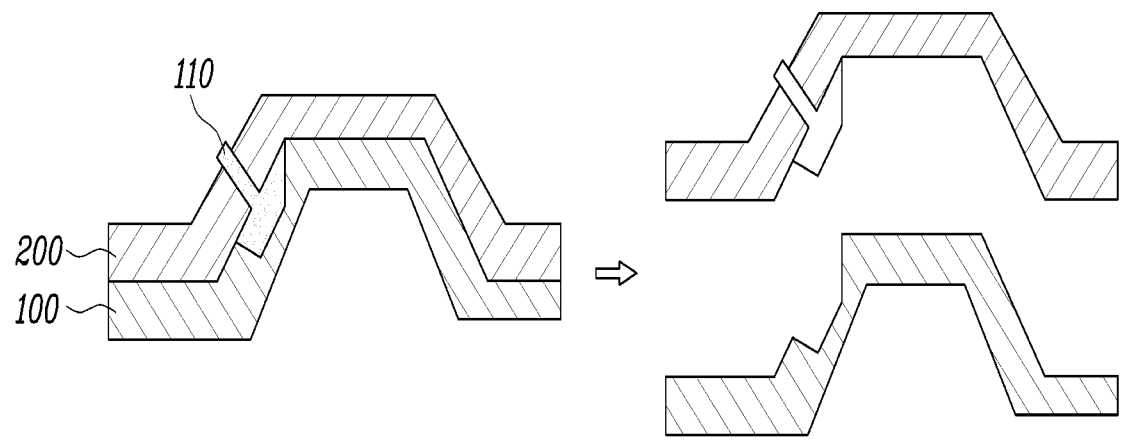
FIG. 7 shows an exemplary jig, an exemplary protrusion, and a plurality of exemplary woven substances according to an exemplary embodiment of the present invention.

As described above, the protrusion 110 may be separated from the jig 100. Accordingly, a plurality of the woven substances and the protrusion 110 may be separated together from the jig 100, and the protrusion 110 may be then separated from the plurality of the woven substances 200. Thus, damage to the aperture formed in the woven substances 200 cured with the resin may be minimized or reduced when the protrusion 110 is forcibly separated from the plurality of the woven substances 200. In another example, when the jig 100 has a steric shape instead of a flat plate shape, as shown in FIG. 7, the longitudinal direction of the aperture may be different from the direction in which the protrusion is separated from the jig 100. In this case, the jig 100 and the protrusion 110 may be formed to avoid interfering with each other, to more easily separate the protrusion 110 from the jig 100.

Alternatively, the protrusion 110 may be made of a material that is easily broken by impact, or may be made of a water-soluble resin that is soluble in water, to minimize damage to the aperture and separate the protrusion 110 from the plurality of the woven substances 200. When the protrusion 110 is made of a material that is easily broken by an impact, the plurality of the woven substances 200 and the protrusion 110 may be separated together from the jig 100, and then air may be sprayed on, or vibrations may be applied to, the protrusion 110 to break the protrusion 110. When the protrusion 110 is made of a water-soluble resin that is soluble in water, such as a water-soluble epoxy resin, the plurality of the woven substances 200 and the protrusion 110 may be separated together from the jig and then immersed together in water to dissolve the protrusion 110. The dissolved water-soluble resin may be recovered and then reused to manufacture the protrusion 110.

The composite material including the aperture according to the present invention may be manufactured by the method described above. The method may include: disposing or layering a plurality of woven substances 200 including reinforcement fibers on a jig 100 having a protrusion 110 to fit the woven substances 200 on the protrusion 110 and thus provide the aperture at S100; integrally mounting the jig 100 and a plurality of the woven substances 200 in a mold 10 at S200; and adding a resin to the mold 10 to immerse a plurality of the woven substances 200 with the resin at S300.

Further, the composite material may be processed by, after the adding of the resin at S300, curing the resin added to a plurality of the woven substances 200 at S400, and separating the plurality of the woven substances 200 including the cured resin from the jig 100 at S500.

For the composite material including the aperture manufactured using the aforementioned manufacturing method, a plurality of the woven substances 200 including the carbon fibers as reinforcement fibers may be layered to insert the protrusion 110, as being provided on the jig 100, into the gaps of the woven substances, for example, between the gaps of the reinforcement fibers, thus specifying the position and size of the aperture.

Further, after the immersing and curing process of the resin, the aperture may be formed through a plurality of the woven substances 200 after being separated from the jig 100, due to the protrusion 110 of the jig 100. Accordingly, additional separate processes may be omitted, thus reducing production costs and improving productivity.

Since a milling machine or a water jet may be omitted in forming the aperture according to the present invention, processing inferiority and secondary pollution may be prevented, and fractures caused by breaking of the continuous fibers constituting the woven substances may not be formed, thereby preventing strength from being reduced. Preferably, the woven substances may include carbon fibers, such that a composite material having excellent mechanical properties such as tensile strength may be manufactured.

Although the various exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a composite material that is formed to include an aperture, comprising:
    disposing a plurality of woven substances on a jig having a protrusion, wherein the woven substances comprise reinforcement fibers;
    integrally mounting the jig and the plurality of the woven substances in a mold;
    adding a resin to the mold to immerse the plurality of the woven substances with the resin, wherein the protrusion penetrates the woven substances and the aperture is formed in the woven substances by the protrusion disposed on the jig,
    curing the resin added to the plurality of the woven substances; and
    separating the plurality of the woven substances including the cured resin from the jig,
    wherein the protrusion and the plurality of the woven substances are separated from the jig as the plurality of the woven substances are fitted on the protrusion during the separating the plurality of the layered woven substances.

2. The method of claim 1, wherein the plurality of the woven substances are layered on the jig.

3. The method of claim 1, wherein the protrusion has a bent shape and the aperture is formed in a shape corresponding to a shape of the protrusion.

4. The method of claim 1, wherein the protrusion comprises a water-soluble resin.

5. The method of claim 4, further comprising:
    dissolving the protrusion in water to remove the protrusion from the plurality of the woven substances after the separating the plurality of the woven substances.

6. The method of claim 1, wherein the woven substances are fitted on the protrusion using gaps formed in the woven substances during the disposing the plurality of the woven substances.

7. A composite material including an aperture manufactured using a method, the method comprising:
    disposing a plurality of woven substances on a jig having a protrusion, wherein the woven substances comprises reinforcement fibers, and the protrusion penetrates the woven substances and the aperture is formed in the woven substances disposed on the jig;
    integrally mounting the jig and the plurality of the woven substances in a mold; adding a resin to the mold to immerse the plurality of the woven substances with the resin;
    curing the resin added to the plurality of the woven substances; and separating the plurality of the woven substances including the cured resin from the jig,
    wherein the protrusion and the plurality of the woven substances are separated from the jig as the plurality of the woven substances are fitted on the protrusion during the separating the plurality of the layered woven substances.

8. The composite material of claim 7, wherein gaps in the woven substances are widened to form the aperture as the protrusion penetrates the woven substances.

9. The composite material of claim 7, wherein the woven substances include carbon fibers.

* * * * *